(12) United States Patent
Janssen et al.

(10) Patent No.: US 7,433,962 B2
(45) Date of Patent: Oct. 7, 2008

(54) MULTI-USER COMPUTER SYSTEM WITH AN ACCESS BALANCING FEATURE

(75) Inventors: Bob Janssen, Lage Zwaluwe (NL); Peter Gerardus Jansen, Eindhoven (NL)

(73) Assignee: Real Enterprise Solutions Development B.V., Bussum (NL)

( * ) Notice: Subject to any disclaimer, the term of this patent is extended or adjusted under 35 U.S.C. 154(b) by 587 days.

(21) Appl. No.: 10/087,044

(22) Filed: Feb. 28, 2002

(65) Prior Publication Data

US 2003/0163576 A1   Aug. 28, 2003

(51) Int. Cl.
G06F 15/16 (2006.01)
G06F 5/00 (2006.01)

(52) U.S. Cl. .......................................... 709/235; 710/52

(58) Field of Classification Search ................... 710/39, 710/45, 52, 53, 56, 61, 200, 240; 709/235, 709/229
See application file for complete search history.

(56) References Cited

U.S. PATENT DOCUMENTS

| | | | | |
|---|---|---|---|---|
| 5,649,157 A * | 7/1997 | Williams | ..................... | 711/151 |
| 6,035,404 A * | 3/2000 | Zhao | ............................. | 726/6 |
| 6,154,769 A * | 11/2000 | Cherkasova et al. | ......... | 709/207 |
| 6,285,665 B1 * | 9/2001 | Chuah | ......................... | 370/319 |
| 6,327,254 B1 * | 12/2001 | Chuah | ......................... | 370/328 |
| 6,412,007 B1 * | 6/2002 | Bui et al. | .................... | 709/227 |
| 6,510,214 B1 * | 1/2003 | McDaniel | .................... | 379/134 |
| 6,745,262 B1 * | 6/2004 | Benhase et al. | .............. | 710/40 |
| 6,757,679 B1 * | 6/2004 | Fritz | ............................. | 707/8 |

* cited by examiner

*Primary Examiner*—Krisna Lim
(74) *Attorney, Agent, or Firm*—Knoble, Yoshida & Dunleavy, LLC

(57) ABSTRACT

A multi-user computer system, and method for creating a user session that comprises processing a log-on request entered by a user. The creation of the user session is halted when more than a maximum number of simultaneous log-on requests, maintained as a variable in the multi-user computer system, are being processed.

19 Claims, 2 Drawing Sheets

MULTI-USER COMPUTER SYSTEM WITH AN ACCESS BALANCING FEATURE

BACKGROUND OF THE INVENTION

1. Field of the Invention

The invention relates to a multi-user computer system, in particular to a method of controlling the creation of a user session in such a system.

2. Brief Description of the Prior Art

Multi-user computer environments are known in a number of different variants. Common examples of such environments consist of one or more servers, and a number of computer terminals connected to the server, usually through a network. A server operating system is installed on the server(s), together with several applications, such as spreadsheet programs, word processors, etc. The software on the server, and other resources in the system are accessible to users of the terminals. To access the software and other resources, the user makes a request to log on to the system. Such a request marks the start of the creation of a user session. This entails amongst others the loading of device drivers, setting up background processes specified for the user, and creating page files, for example. The creation of a user session is a process that makes heavy use of the server resources, particularly the disk drives on which the various executables are stored.

System management programs exist to manage user sessions and their creation, in order, amongst others, to ensure that the system is not overloaded. This frequently occurs at certain times, for example at the start of the working day, when all employees in an organisation log on at once. At such times, the system can become very slow, with the creation of user sessions taking an inordinate amount of time. In the worst case, the system can break down all together. One type of system management program uses the principle of load balancing to alleviate problems associated with many simultaneous log-on requests. The processing of these requests is spread out as evenly as possible amongst a group of servers, each capable of independently creating user sessions. This principle suffers from the disadvantage that an increase in the number of users inevitably requires the addition of extra servers to the system at some point. The system is thus dimensioned to cope with peak use, since subsequent use of the system is usually much less heavy, due to users pausing with their work, for example.

BRIEF SUMMARY OF THE INVENTION

The invention allows the capacity of a multi-user system to be tailored to the average user requirements, thus making more efficient use of the available resources.

In the method of creating a user session, the creation of the user session is halted when more than a pre-determined number of simultaneous log-on requests are being processed. The creation of the user session is therefore not aborted but suspended, when it is halted. This makes the method user-friendlier. The user does not have to make the request again.

The system according to the invention includes means for determining the number of log-on requests simultaneously being processed, and means for halting the creation of the user session if the number of log-on requests simultaneously being processed exceeds a maximum number. Thus, the system is prevented from being overloaded by a large number of simultaneous requests to create user sessions. Users experience a fast and responsive environment.

The computer program according to the invention comprises one or more routines for processing a log-on request entered by a user, one or more routines for determining the number of log-on requests simultaneously being processed and a routine for halting the creation of the user session when more than a maximum number of log-on requests are being processed simultaneously.

The computer program is therefore of use in equipping a computer system with the capability of executing the method according to the invention. A system administrator can usefully employ the program to manage the system's resources.

The invention will now be described in further detail with reference to the accompanying drawings.

DETAILED DESCRIPTION OF THE INVENTION

The invention is quite generally applicable in multi-user computer systems. Such systems keep information on each of a number of known users. When the user wishes to make use of the system, he makes himself known by entering a log-on request. The log-on request functions as a trigger to the system to create a user session. A user session is a series of interactions between the user and the system. The system sets up the requested session by using the information to provide the user with a personalised interface to some or all of the system's resources.

Setting up a user session can entail the following actions, for example: mapping drives, loading device drivers, such as printer drivers, loading environment variables, such as the path for the user's home directory, the language of the user interface, etc., displaying messages to the user, starting up user space daemon processes, and loading the shell and/or the window manager preferred by the user.

Figure 1:
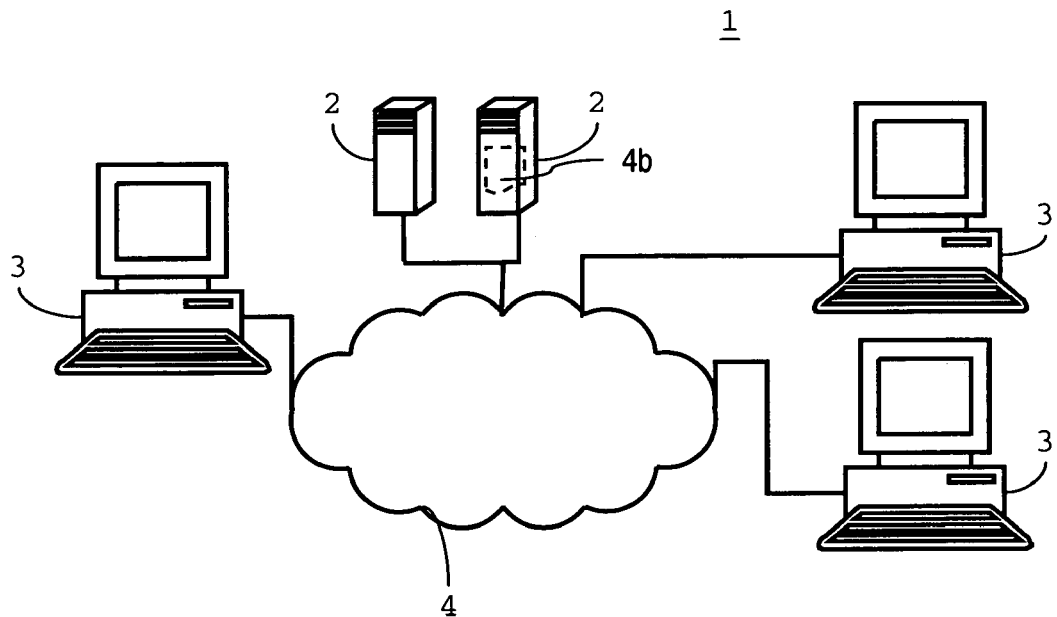
FIG. 1 shows a schematic diagram of a client-server environment, suitable for applying an embodiment of the invention.

A schematic diagram of a distributed computer system 1, as an example of a multi-user computer system, is shown in FIG. 1. It comprises several servers 2 and terminals 3, interconnected by means of a network 4.

The terminals 3 can be workstations, personal computers, notebook computers, or even palmtop computers or embedded systems. The network 4 can comprise wireless, infrared, glass fibre or co-axial connections, for example. The invention is not limited to a particular kind of network 4. In terms of the physical dimensions, the network 4 can span an office, a building, a corporation, or even the world, in case of the Internet.

The invention is not limited in terms of the number of terminals 3 and servers 2, either. At one extreme, there can be one terminal 3 and one server 2. Indeed, server 2 and terminal 2 can be one machine, in which case no network 4 is needed. At the other end of the spectrum, there can be several dozens of servers 2, set up as a server farm. The invention can be used by an application service provider running such a server farm. The invention is quite generally intended for computer systems in which multiple users are defined.

The invention is especially useful for use in a distributed computer system 1 where the applications are predominantly installed on the servers 2. It is possible to use the invention in a system 1 comprising only so-called 'thin clients'. In such systems, application processing is performed entirely on the servers 2 and not on the terminals 3. Only input and output information is passed between the terminals 3 and the servers 2. It is equally possible to apply the invention in systems in which servers 2 are only used to store files that are needed by the terminals 3 to run applications, or where the servers 2 represent resources shared by the terminals 3.

The terminals 3 and servers 2 can have a single operating system in common, or interacting client and server operating systems can be installed on the terminals 3 and servers 2 respectively.

The invention provides system software 4b comprising a so-called Access Balancing feature to manage the system in a more efficient way. Although it will be described as a layer of software over the operating system software, it will be understood that it could be integrated in the latter, or implemented as middleware.

The user of a terminal 3 is provided with an interface for entering a request to log on to the system. The request comprises the user's credentials: a user name and password, for example, or some other piece of information allowing the user's identity to be verified.

Figure 2:
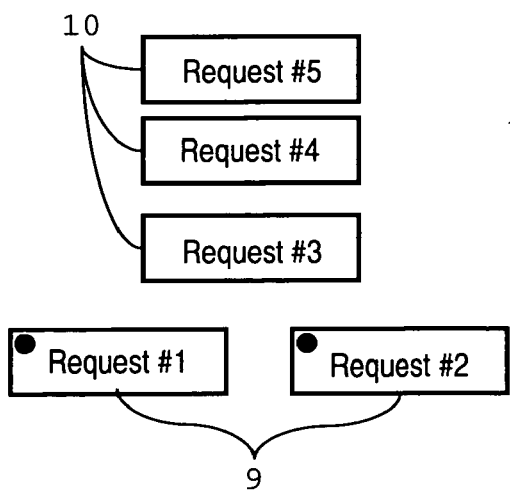
FIG. 2 shows a schematic diagram of a waiting queue.

The request triggers the system 1 into a state 6, shown in FIG. 2, wherein the log-on request is processed.

Assuming the Access Balancing feature is enabled, the system 1 moves to a state 7 in which the user's log-on request is assigned a free slot in a waiting queue 8 of currently pending log-on requests, schematically shown in FIG. 2. The waiting queue 8 is a record with an entry for each slot. Fields in an entry include, but are not limited to, fields indicating the owner of the request assigned to the slot, and the position of the slot in the waiting queue 8.

Figure 3:
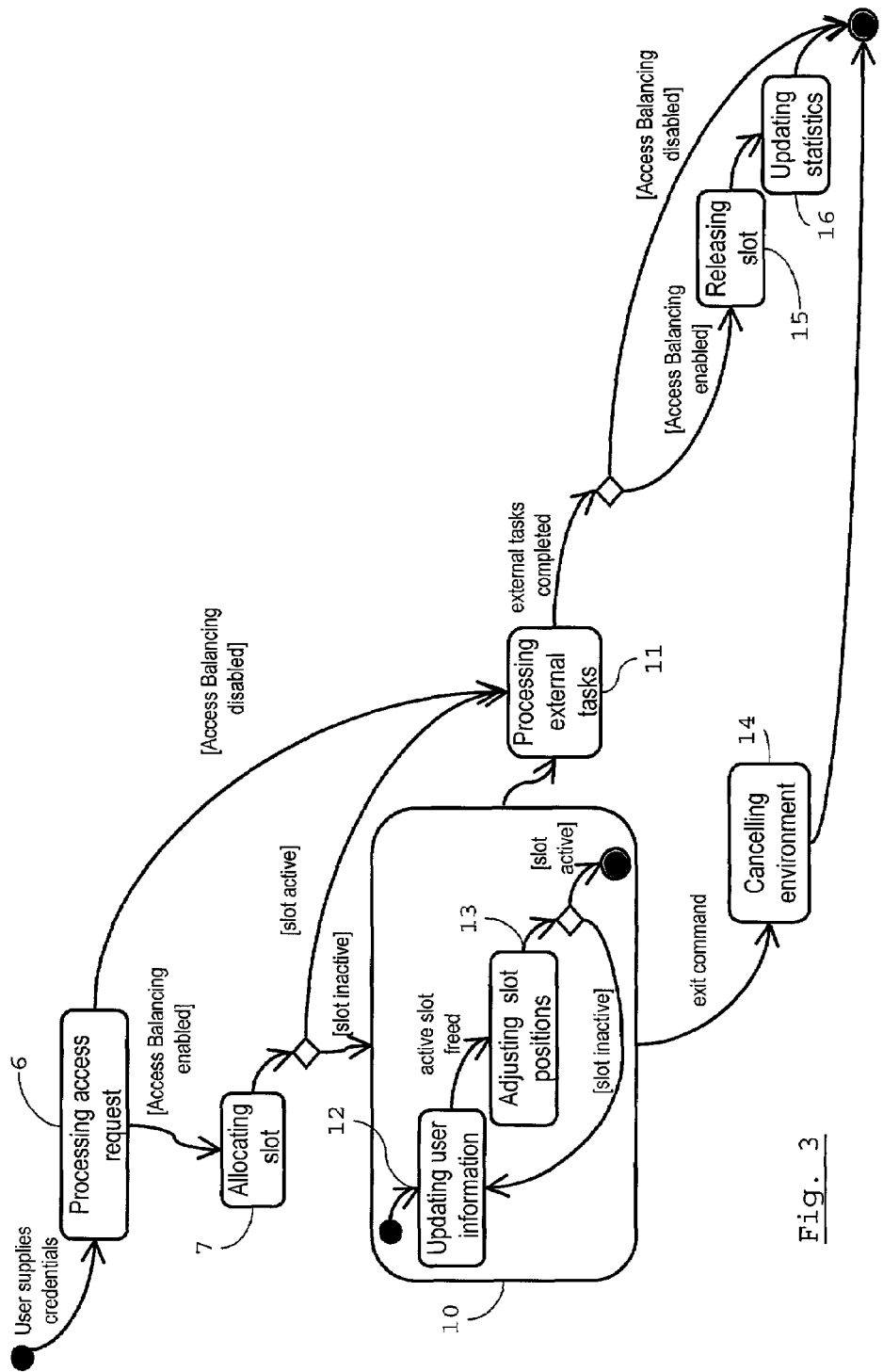
FIG. 3 shows a state chart diagram illustrating an embodiment of the invention.

Slots in the waiting queue 8 are divided into active slots 9 and wait slots 10. In FIG. 3, the active slots 9 are marked with a dot. In the state 7 in which the request is allocated a slot in the waiting queue 8, the highest unallocated slot position is determined. The log-on request is assigned to this slot.

If a log-on request is in a wait slot 10, the creation of the requested user session is halted. The system 1 is now in a composite state 10, applicable to requests that are in a wait slot 10.

If the entered log-on request has been assigned to an active slot 9, the system 1 will move to state 11, in which external tasks are processed. The external tasks are the tasks associated with the creation of the user session, which have been described above. The exact implementation depends on the operating system. The tasks are referred to as external, because they are controlled by programs that are separate from the programs providing the Access Balancing feature.

The use of the waiting queue 8 with active slots 9 and wait slots 10 provides a simple and effective way to separate requests. Those requests assigned to a wait slot 10 are halted. Assignment of a log-on request to an active slot 9 triggers the system 1 to continue creating the user session requested. The number of active slots 9 determines the maximum number of log-on requests that are allowed to be simultaneously processed.

A system administrator is able to adjust the maximum number of active slots 9. This can be done dynamically, i.e. whilst the system 1 is up and running. The maximum allowed number of active slots 9 is simply a variable.

In the composite state 10, in which a log-on request is in a wait slot 10, user information is updated first, in state 12. The system management software comprises routines for providing a Graphical User Interface (GUI) on a terminal 3 on which the request was made. In one preferred embodiment, the GUI comprises a window displaying the position of the log-on request in the waiting queue 8 to the user.

Whenever a user session has been created, the log-on request for creating this user session is removed from the waiting queue 8. This freeing of an active slot 9 serves as a trigger for the system 1 to move to a state 13, in which log-on requests are assigned to a next slot position. If the next slot is also a wait slot 10, The system 1 returns to state 12. The user information is updated. The user is thus aware of the progress of his request.

An option is provided for the user to cancel his log-on request when the creation of the user session has been halted, i.e. when the system 1 is in composite state 10. The option can, for instance be provided as a button in the window displaying the position of the user's slot in the waiting queue 8. Of course, other mechanisms, such as a particular key or combination of keys are also possible. The command to exit triggers a move into a state 14, in which the system 1 removes the data associated with the log-on request from the record of log-on requests, and in which parts of the user environment already created are cancelled.

When the creation of another user session has been completed, a next log-on request is assigned to an active slot 9. assignment of a log-on request to an active slot 9 triggers the system 1 to resume the creation of the requested user session. The system 1 moves to state 11 in which the external tasks are processed.

Completion of the processing of the external tasks trigger the system 1 to move to a state 15, in which the active slot 9 is released. Subsequently, the other pending requests are assigned to a next slot.

In a state 16, statistics relating to the creation of user sessions during a certain time interval are updated when the creation of a user session has been completed. This marks the end of the creation of the user session.

The statistics can comprise a large amount of information relating to the use of the computer system and its resources. Preferably, statistics are updated regarding the average time a request occupies a wait slot and the maximum time that any request has to wait. The use of the exit command when the system is in the composite state 10 can be monitored, for instance the number of times the command is issued and the time interval spent in the waiting queue, before the exit command is issued. Statistics can be compiled for the entire computer system 1, or for each of the several servers 2. Thus, the use of these servers 1 can be monitored. The number of requests processed on each server 1 can be monitored, as well as the average time a request spends in the waiting queue. This is valuable information for a system administrator wishing to maximise computer resources. It enables him to judge whether the capacity of the system is being used to its full extent. This information can be used when making purchasing decisions.

The Access Balancing feature can be disabled by a system administrator. This is of use when no overloading of the computer system 1 is expected. Since the Access Balancing feature uses up some resources, some performance is gained when it is switched off if not needed.

If the access balancing feature is disabled, the system 1 moves straight from the state 6 in which a log-on request is processed, to state 11, in which the user environment is completed.

In a preferred embodiment, not illustrated in FIG. 3, the system 1 comprises a feature for preventing hanging sessions from blocking the waiting queue 8. A log-on request that cannot be completed is removed from the waiting queue 8.

This removal signals the end of the creation of the requested user session. The slot positions of the other log-on requests are updated.

The system management program comprises one or more routines for updating the entry of a user session in the record during its creation. The update is carried out repeatedly during creation of the user session. If a time interval starting from a previous update is exceeded and no update has taken place, the creation of the user session is aborted. The slot in the waiting queue 8 is also vacated. The positions of the other slots in the waiting queue 8 are then updated. Thus, the maximum allowable number of active slots 9 is not effectively decreased when a user session occupying one of the slots hangs.

According to one preferred aspect of the invention, the creation of a user session is resumed when the creation of another user session has been completed. In a preferred method according to the invention, each log-on request is preferably assigned a slot at a certain position in a waiting queue of currently pending requests, and the log-on request is assigned to a next slot in the waiting queue when a user session has been created. This enables the system to order the requests in a way that is fair to all users, instead of processing pending requests in a random order.

In a preferred embodiment of the invention, information on the position of the log-on request in the waiting queue is displayed to the user. Thus, impatience on the part of the user is avoided. The user can estimate when his session will be up and running, and can do something else until that time.

Preferably, a log-on request that cannot be completed is removed from the waiting queue. Thus, no time and resources are wasted on trying to create such a user session. If, for example a certain file cannot be found, or a required device is down, the creation of other user sessions will not be affected. An added advantage of this feature lies in the fact that it makes it possible to ensure that information provided to other users on the number of requests to be processes before theirs is accurate.

According to another aspect of the invention, a user may be provided with an option to cancel a log-on request when the creation of the user session is halted. Thus if the user decides not to use the system, but do something else, no time and resources are wasted on creating a session that will not be used anyway.

Preferably, one or more embodiments of the system of the present invention comprise a waiting queue with active slots and wait slots, wherein the number of active slots equals the maximum number, and further comprises means for assigning each log-on request to a slot at a certain position in the waiting queue. Thus, log-on requests can be separated in a simple and effective manner into requests that are processed and requests of which the processing is halted.

Preferably, one or more embodiments of the system comprise means for adjusting the number of active slots. Thus, the number user sessions that are allowed to be simultaneously created can be dynamically adjusted, i.e. whilst the system is being used. It is therefore possible for a system administrator to find a compromise between the speed at which user sessions are created and the length of time a request spends in the waiting queue.

It will be understood by those skilled in the art that the invention is not limited to the embodiments described above, but can be varied within the scope of the claims. For instance, the trigger to remove a log-on request from the waiting queue could also be an error message entered in the record for the slot position occupied by the log-on request. Also, instead of maintaining the waiting queue as an array of slots at fixed positions, it is also possible to implement the waiting queue as an array of log-on requests, each with a variable indicating its position in the waiting queue.

The invention claimed is:

1. In a multi-user computer system, a method of controlling the creation of a user session, comprising processing a log-on request entered by a user at a terminal, wherein the creation of the user session is halted when more than a maximum number of log on requests, maintained in the multi-user system as a variable that can be adjusted, are being processed simultaneously.

2. A method according to claim 1, wherein the creation of a user session is resumed when the creation of another user session has been completed.

3. A method according to claim 2, wherein each log-on request is assigned a slot at a certain position in a waiting queue of currently pending requests, wherein the log-on request is assigned to a next slot in the waiting queue when a user session has been created.

4. A method according to claim 3, wherein information on the position of the log-on request in the waiting queue is displayed to the user.

5. A method according to claim 3, wherein a user session of which the creation cannot be completed is detected, and the log-on request to create the users session is removed from the waiting queue.

6. A method according to claim 5, wherein a slot to which a log-on request has been assigned is continually updated with information regarding the creation of the requested user session, and wherein a log-on request is removed from the slot to which it has been assigned if the slot is not updated.

7. A method according to claim 1, wherein a user is provided with an option to cancel a log-on request when the creation of the user session is halted.

8. A method according to claim 7, wherein a user is provided with an option to cancel a log-on request together with the information displayed to the user.

9. A method according to claim 1, wherein statistics relating to the creation of user sessions during a certain time interval are updated when the creation of a user session has been completed.

10. A multi-user computer system, comprising at least one terminal for a user to enter a log-on request for creation of a user session, wherein the system further comprises means for determining the number of log-on requests simultaneously being processed, and means for halting the creation of the user session if the number of log-on requests simultaneously being processed exceeds a maximum number, maintained in the multi-user system as a variable that can be adjusted.

11. A multi-user computer system according to claim 10, comprising a waiting queue with active slots and wait slots, wherein the number of active slots equals the maximum number, further comprising means for assigning each log-on request to a slot at a certain position in the waiting queue.

12. A multi-user computer system according to claim 11, comprising means for assigning a log-on request to a next slot in the waiting queue when a user session has been created, wherein assignment of a log-on request to an active slot triggers the system to resume the creation of the requested user session.

13. A multi-user computer system according to claim 11, comprising means for adjusting the number of active slots.

14. A computer program stored on a computer readable medium for controlling the creation of a user session in a multi-user computer system, comprising computer-readable instructions stored on a computer readable medium for performing the tasks of processing a log-on request entered by a user at a terminal, determining the number of log-on requests simultaneously being processed and halting the creation of the user session when more than a maximum number, maintained as an adjustable variable in the multi-user computer system, of log-on requests are being processed simultaneously.

15. A computer program according to claim 14, comprising computer-readable instructions for performing the tasks of assigning each log-on request to a slot at a certain position in a waiting queue of currently pending requests, and assigning the log-on request to a next slot in the waiting queue when a user session has been created.

16. A computer program according to claim 15, comprising computer-readable instructions for performing the task of displaying information on the position of the log-on request in the waiting queue to the user.

17. A computer program according to claim 15 comprising computer-readable instructions for performing the tasks of detecting a user session of which the creation cannot be completed, and removing the log-on request to create the user session from the waiting queue.

18. A computer program according to claim 14, comprising computer-readable instructions for performing the task of adjusting the maximum number of log-on requests.

19. In a multi-user computer system, a method of controlling the creation of a user session, comprising processing a log-on request entered by a user at a terminal, wherein the creation of a user session is halted when more than a maximum number, maintained as a variable in the multi-user computer system, of log-on requests are being processed simultaneously, said system including an adjustment mechanism for dynamically adjusting the maximum number of user sessions which can be processed simultaneously.

* * * * *